(12) United States Patent
Miles

(10) Patent No.: US 10,035,447 B2
(45) Date of Patent: Jul. 31, 2018

(54) ELEVATING STORAGE APPARATUS

(71) Applicant: Shane Robert Miles, Queensland (AU)

(72) Inventor: Shane Robert Miles, Queensland (AU)

(*) Notice: Subject to any disclaimer, the term of this patent is extended or adjusted under 35 U.S.C. 154(b) by 143 days.

(21) Appl. No.: 14/776,471

(22) PCT Filed: Mar. 13, 2014

(86) PCT No.: PCT/AU2014/000257
§ 371 (c)(1),
(2) Date: Sep. 14, 2015

(87) PCT Pub. No.: WO2014/138797
PCT Pub. Date: Sep. 18, 2014

(65) Prior Publication Data
US 2016/0031354 A1    Feb. 4, 2016

(30) Foreign Application Priority Data

Mar. 15, 2013    (AU) ................................ 2013900915
Mar. 18, 2013    (AU) ................................ 2013900938

(51) Int. Cl.
*B60P 1/44*    (2006.01)
*A47B 46/00*    (2006.01)
(Continued)

(52) U.S. Cl.
CPC .......... *B60P 1/4442* (2013.01); *A47B 46/005* (2013.01); *A47B 51/00* (2013.01);
(Continued)

(58) Field of Classification Search
CPC .................. B60P 1/4442; B60P 1/4414; B60P 2011/0082; A47B 46/005; B60R 2011/0082
(Continued)

(56) References Cited

U.S. PATENT DOCUMENTS

| 1,478,031 | A | * | 12/1923 | Eaton | ..................... B60R 3/002 |
| | | | | | 224/42.35 |
| 1,482,770 | A | * | 2/1924 | Terrell | ..................... B60R 9/06 |
| | | | | | 224/497 |

(Continued)

FOREIGN PATENT DOCUMENTS

| DE | 2631649 | * | 2/1977 | ........... A47B 46/005 |
| DE | 4418752 | * | 11/1995 | ........... B60P 1/4442 |

(Continued)

OTHER PUBLICATIONS

"International Preliminary Report on Patentability", issued in related International Application No. PCT/AU2014/000257; dated Jul. 2, 2015.

(Continued)

*Primary Examiner* — Michael Safavi
(74) *Attorney, Agent, or Firm* — Kaplan Breyer Schwarz, LLP

(57) ABSTRACT

This invention provides elevating storage apparatus (10) for storing an article or articles in an elevated position from which the article(s) cannot be vertically lowered because an obstacle obscures the space there beneath. To achieve this the article(s) which are supported on article support means (14) are moved outwardly with the article support means (14) supported by a pair of spaced apart slide assemblies (11, 12) for longitudinal movement between the stowed elevated position above the obscuring obstacle and a withdrawn elevated position forward of the obstacle. The article support means (14) is connected to the slide assemblies (11, 12) by links (52, 53) which enable the article support means to be raised and lowered between substantially vertically aligned withdrawn elevated position and the lower accessible position. Control means (60) is provided for selectively raising and lowering the article support means (14) relative to the (Continued)

slide assemblies (11, 12) and for moving the article support means to and from its stowed elevated position.

12 Claims, 6 Drawing Sheets

(51) Int. Cl.
 *B60R 11/00* (2006.01)
 *A47B 51/00* (2006.01)
(52) U.S. Cl.
 CPC .......... *B60P 1/4414* (2013.01); *B60P 1/4421* (2013.01); *B60R 11/00* (2013.01); *B60R 2011/0028* (2013.01); *B60R 2011/0082* (2013.01); *B60R 2011/0084* (2013.01); *B60R 2011/0092* (2013.01)
(58) Field of Classification Search
 USPC .............. 108/138, 143, 145, 149; 224/42.35, 224/42.36, 281, 403, 497, 564; 280/760, 280/769
 See application file for complete search history.

(56) References Cited

U.S. PATENT DOCUMENTS

| | | | | |
|---|---|---|---|---|
| 1,831,266 A * | 11/1931 | Schwartz | ................. | B60R 9/02 224/42.35 |
| 1,912,958 A * | 6/1933 | Widener | ................... | B60R 9/06 224/497 |
| 2,228,203 A * | 1/1941 | De Hoffmann | ........ | B60N 3/001 108/44 |
| 2,545,269 A * | 3/1951 | Ford | ......................... | G09F 5/02 224/42.32 |
| 4,058,228 A * | 11/1977 | Hall | ..................... | B60P 1/4442 105/433 |
| 4,150,861 A | 4/1979 | Dufrancatel | | |
| 4,455,948 A * | 6/1984 | Torres | ..................... | A47B 31/06 108/138 |
| 4,923,259 A * | 5/1990 | Bartok | ............... | A47B 21/0314 108/143 |
| 4,938,441 A * | 7/1990 | Hannah | .............. | A47B 21/0314 108/143 |
| 4,958,979 A * | 9/1990 | Svensson | .............. | B60P 1/4435 182/158 |
| 5,294,087 A * | 3/1994 | Drabczyk | ............ | A47B 21/007 108/138 |
| 5,301,992 A | 4/1994 | Whitmore | | |
| 5,339,749 A * | 8/1994 | Hirose | ................. | B23Q 1/5468 108/137 |
| 5,346,355 A * | 9/1994 | Riemer | ................. | B60P 1/4435 224/310 |
| 5,588,375 A * | 12/1996 | Cotterill | ............. | A47B 21/0314 108/102 |
| 5,758,782 A * | 6/1998 | Rupert | ................... | A47B 46/00 211/104 |
| 6,019,567 A * | 2/2000 | Lutkus | .................... | B60P 1/003 414/501 |
| 6,042,168 A * | 3/2000 | Bieri | ........................ | B60R 7/06 224/281 |
| 6,523,919 B1 | 2/2003 | Israelsen et al. | | |
| 6,726,435 B1 * | 4/2004 | Williams | .............. | B60P 1/4442 414/497 |
| 7,048,236 B2 * | 5/2006 | Benden | .............. | A47B 21/0314 108/138 |
| 7,455,341 B2 * | 11/2008 | Miyashita | .............. | B60N 3/102 220/345.4 |
| 9,707,880 B2 * | 7/2017 | Ochenkowski | ....... | B60P 1/4442 |
| 2001/0026756 A1 * | 10/2001 | Mortimore | ............ | B60P 1/4442 414/556 |
| 2003/0042380 A1 * | 3/2003 | Hagglund | .......... | A47B 21/0314 248/286.1 |
| 2006/0191449 A1 * | 8/2006 | Patten | ................... | A47B 46/005 108/138 |
| 2011/0255943 A1 * | 10/2011 | L'Ecuyer | .............. | B60P 1/4442 414/541 |
| 2016/0159264 A1 * | 6/2016 | Ochenkowski | ....... | B60P 1/4442 414/544 |

FOREIGN PATENT DOCUMENTS

WO  2009052558 A1  4/2009
WO  WO2015133978  *  9/2015  ............ A61G 3/062

OTHER PUBLICATIONS

"International Search Report", issued in related International Application No. PCT/AU2014/000257; dated May 8, 2014.

* cited by examiner

ELEVATING STORAGE APPARATUS

TECHNICAL FIELD

This invention relates to elevating storage apparatus.

Many forms of storage apparatus are used to enable stored articles to be retrieved to an accessible position. One of the most common forms of storage apparatus is a drawer supported by a compound drawer slide which enables the drawer to be fully withdrawn and supported beyond its stowed position so as to provide full access to the open top of the drawer. These compound storage slides have been found useful for organised stowage in vehicles enabling the secure stowage of articles supported thereby when travelling and ready clear access to the articles when the vehicle is parked.

BACKGROUND ART

In recent years a large range of storage apparatus has been developed for specialised stowage in off-road vehicles. Such storage apparatus includes elevating storage apparatus for articles, such as top loading insulated food containers and refrigerators, which need to be elevated from their accessible position and then moved inward for stowage in or on an elevated part of the vehicle. Such elevating storage apparatus enable stowed articles to be withdrawn from their elevated stowed position to a withdrawn elevated position from which they may be controllably lowered to an accessible position supported by the elevating storage apparatus at an accessible height below and outward of their stowed position.

My earlier Australian patent No. 2009245888 illustrates one such elevating storage apparatus in which an article supporting base is attached to opposed supporting slides by linkages and an associated lever means provided to control the lowering and raising of the supporting base. This has proven commercially successful. However it has the feature that raising the supporting base from its accessible position is accompanied by an inward movement of the supporting base. While this provides greater clearance from an obstacle positioned below the stowed position it does require the use of robust drawer slides able to support the withdrawn supporting base rigidly in its accessible position which may be further from the vehicle support than is sometimes desired.

Attempts have been made to provide alternative elevated storage apparatus, such as is described in Australian Innovation patent No. 201310028, however such attempts have been overly complex, relatively heavy and thus expensive to manufacture and/or relatively inconvenient or inefficient to use.

As many of the vehicles utilising such elevating storage apparatus are fully enclosed vehicles with space restrictions, the provision of safe, simple and suitable lever means which is readily accessible to be utilised to withdraw the stowed article and then to lower the article to an accessible position in an easy controlled movement and vice versa and be positioned when not in use in an unobtrusive position presents a difficult problem to solve elegantly, simply and robustly.

SUMMARY OF INVENTION

This invention aims to provide elevating storage apparatus which will alleviate at least one of the abovementioned disadvantages. Other objects and advantages of this invention will hereinafter become apparent.

With the foregoing in view, this invention in one aspect resides broadly in elevating storage apparatus, including:

a pair of spaced apart slide assemblies for supporting article support means therebetween for longitudinal movement between a stowed elevated position above an obstacle and a withdrawn elevated position forward of the obstacle;

linkage means connecting the article support means to the slide assemblies which enable the article support means to be raised and lowered between substantially vertically aligned withdrawn and accessible positions, and control means for selectively positioning the article support means relative to the slide assemblies.

Each slide assembly may include an outer support adapted for mounting to and rearwardly of the front edge of an elevated surface for supporting an inner slide assembly for longitudinally movement therealong for movement between the stowed and withdrawn elevated positions. However this requires the article support means to be relatively short so that it can be withdrawn beyond the obstacle as a supporting overlap must be maintained between the inner slide assembly and the outer support. Alternatively the outer support may extend beyond the front edge of an elevated surface to provide the necessary overlap. However this increases the overall length of the elevating storage apparatus when in the stowed attitude.

In a preferred form, each slide assembly is a compound slide assembly including an outer fixed slide support, an intermediate slide support and an inner slide assembly which can be withdrawn from a stowed elevated position to a withdrawn elevated position at which both inner slide assemblies are supported beyond the outer fixed slide supports. The compound slide assembly may be of any suitable type such as slide assemblies in which the intermediate slide supports float, operatively positioned by frictional engagement between the parts of the compound slide assembly. The compound slide assemblies may use, for example, friction slides, wheels or rolling element bearings for moveably supporting each intermediate slide assembly and each inner slide assembly. Alternatively the compound slide assemblies may be of the type wherein the relative position between intermediate slide support, the inner slide assembly and the outer fixed slide support are positively controlled by suitable drive means.

The slide assemblies may be adapted for independent connection to the support surface or they may form part of a base frame adapted to be mounted on a surface above an obstacle which may be lower storage means or simply a space which is to be maintained clear of intrusion by the elevating storage apparatus or it may be an internal or external part of a vehicle.

The article support means may be a tray or supporting frame, such as a frame for supporting a refrigerator or it may constitute the base of a cupboard or other stowage means and it may include securing means for securing loads thereto.

The control means may be a handle fixed to the article support means or to a lever arrangement which co-operates with the linkage means whereby the movement of the handle is amplified relative to the movement of the article support means to reduce the effort required to control the position of the article support means. The control means may include a control for selectively actuating powered drive means adapted to cause the linkage means to move the article support means between its accessible position and its withdrawn elevated position and if desired its stowed position.

The drive means may include a liner actuator, or a telescopic ram assembly operable for raising and/or lowering the article support means and which, if desired, may be controlled by a handle such that the powered drive means follows the operation of the handle which would only require light up or down pressure to cause corresponding up or down movement of the article support means.

The control means may also include energy storage means such as a spring or a gas strut or the like which is energised as the article support means is lowered so as to reduce the effort required to elevate the article support means from a lowered position. If desired the energy storage means may be adjustable for preloading to suit different load weights supported by the article support means. The control means may also include movement damping means which may be independent of or combined with the energy storage means.

The linkage means may utilise spaced longitudinally disposed scissor or pantograph type mechanisms interconnecting the article support means and the inner slide assemblies at each side of the elevating storage apparatus, or spaced transversely extending scissor or pantograph type mechanisms interconnecting respective front and back portions of the article support means and respective front and back ends of the spaced inner slide assemblies for maintaining the article support means parallel to the inner slide assembly as it is raised and lowered. Any such mechanism may have end terminations for the scissor mechanism links on the inner slide assemblies and the article support assembly which float in captive slots which may be constituted by continuous slots in which respective upper or lower ends of the scissor link terminations are secured or separate slots for respective end portions.

If desired, adjustable limit means may be provided for operatively limiting the sliding movement of at least one end of one scissor link on each of the article support means and the inner slide assemblies so as to maintain a selected vertical alignment therebetween or to permit a selected vertical misalignment between the article support means and the inner slide assemblies. Preferably, each scissor type mechanisms includes a link having one end connected to the article support means for pivotal movement only and another link having an adjacent end connected to the inner slide assembly for pivotal movement only so as to maintain a vertical alignment between the inner slide assemblies and the article support means. Furthermore the geometry of the scissor mechanisms may be such as to cause a controlled pivoting of the article support means as it is raised and lowered, such as for varying the attitude of the article support means in the accessible and stowed positions.

Alternatively, the linkage means may include links all of which pivot forwardly when the article support means is raised so as to cause the article support means to move forward beyond its lower accessible position when it is raised. These links may move over guide means or through carriers pivotally connected to the inner slide assemblies so as to reduce the forward movement of the article support assembly when it is raised. If desired, in order to suit a particular application, the links could pivot rearwardly when the article support means is raised.

Selectively operable locking means is suitably provided to secure the guide means or carriers in a desired pivotal relationship with respect to the inner slide assemblies, such as at right angles thereto whereby the guide means or carriers secure the links in a vertical attitude or parallel thereto to hold the support tray in a position at which it may be slid between the stowed position and the fully withdrawn position. The locking means may be constituted by a spring loaded pin supported by the inner slide assembly which, when released will engage in apertures arranged in a locking plate fixed to the guide means or carriers when they are pivoted to their locking positions.

In another arrangement the linkage means includes links which move vertically across guide means or through carriers on the inner slide assemblies. The guide means or carriers could be fixedly connected to the inner slide assemblies or they could be pivotally connected thereto and/or connected through slide mountings. In addition the links which move vertically across the guide means or through the carriers could be fixedly secured to the article support means or pivotally connected thereto. Preferably in such arrangements the guide means or carriers and or the links include one or one which is fixedly located on the inner slide assembly or article support means respectively so as to maintain a selected alignment therebetween while permitting automatic alignment of the remaining links and their respective guide means or carriers so as to assist in the free relative movement therebetween. The guide means or carriers could be formed to extend above the slide assemblies to provide side support for a stowed article or the guide means or carriers could terminate adjacent the upper extremity of the slide assemblies.

In all the above variations of this invention, latching means may be provided for maintaining one or both of the compound drawer assemblies in a selected retracted or extended position. Similarly latching means may be provided for maintaining the linkage means in selected positions. The latching means could automatically latch at each selected position and manually operable override means, preferably associated with the control handle, could be provided to permit all intermediate latching positions between the stowed and accessible positions to be bypassed. Suitably the latches at the latter positions require independent operation for safely securing the article supporting means in these positions.

In a further aspect this invention resides broadly in elevating storage apparatus, including:

a pair of spaced apart compound slide assemblies for supporting article support means therebetween for longitudinal movement between a stowed elevated position above an obstacle and a withdrawn elevated position forward of the obstacle;

respective scissors type linkages connecting the article support means to a sliding inner pivot connection and a fixed outer pivot connection provided on the inner slide assemblies of both said compound slide assemblies, and a stowable handle assembly mounted to the links of said scissor type linkages which connect to the fixed outer pivot connections and said handle assembly being moveable from a stowed position to an extended operative position at which the handle assembly may be utilised to raise and lower the article support assembly and withdraw the article support assembly from its stowed elevated position.

The stowable handle may be a folding handle assembly pivotally connected to the links of said scissor type linkage which connect to the fixed outer pivot connections, and being provided with stop means limiting the downward pivotal movement of the folding handle assembly about its pivotal connection to said links.

Alternatively, the stowable handle may be slidably connected to one or opposed pairs of the links of said scissor type linkages whereby it may be slid along said one link or opposed pairs of the links from a stowed position beside said one link or opposed pairs of the links to its extended operative position at which it may be utilised to pivot the links of the scissors type In yet a further aspect this invention resides broadly in elevating storage apparatus, including:— a pair of spaced apart compound slide assemblies for supporting article support means therebetween for longitudinal movement between a stowed elevated position above an obstacle and a withdrawn elevated position forward of the obstacle, and carriers pivotally attached to each inner slide assembly of each compound slide assembly which slidably support respective links extending to respective pivot connections on the article support means, whereby the article support means may be raised by sliding the links through their respective carriers and by pivoting the carriers and their supported links about the pivotal connections between the carriers and the respective inner slide assemblies.

Each carrier may be an outer telescopic member within which a respective link is telescopically received and suitably at least one of the carriers and its supported link is constituted by a linear drive assembly.

In any of the above variations of the invention, the slide assemblies and some or all of the carriers could be motor driven and the control means could be a remote handpiece for controlling raising and lowering of the article support means and horizontal movement to and from the stowed elevated position.

BRIEF DESCRIPTION OF DRAWINGS

In order that this invention may be more readily understood and put into practical effect, reference will now be made to the accompanying drawings which illustrate preferred embodiments of this invention, wherein.

DESCRIPTION OF EMBODIMENTS

Figure 1:
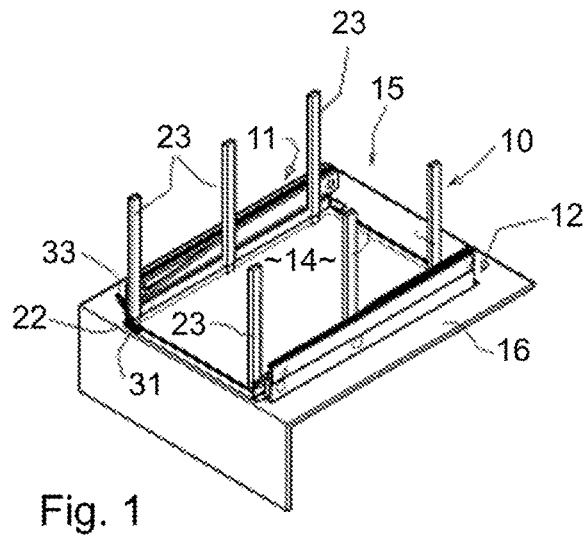
FIG. 1 is illustrates one form of elevated storage apparatus mounted on an elevated support.
Figure 2:
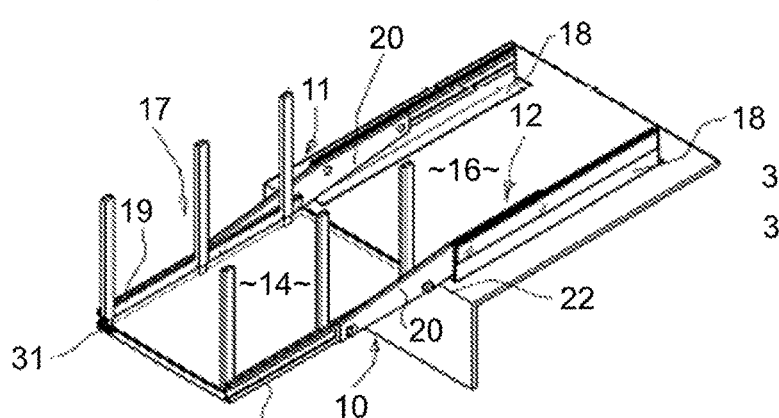
FIG. 2 illustrates the storage apparatus of FIG. 1 disposed with its article support means withdrawn from the stowed position.
Figure 3:
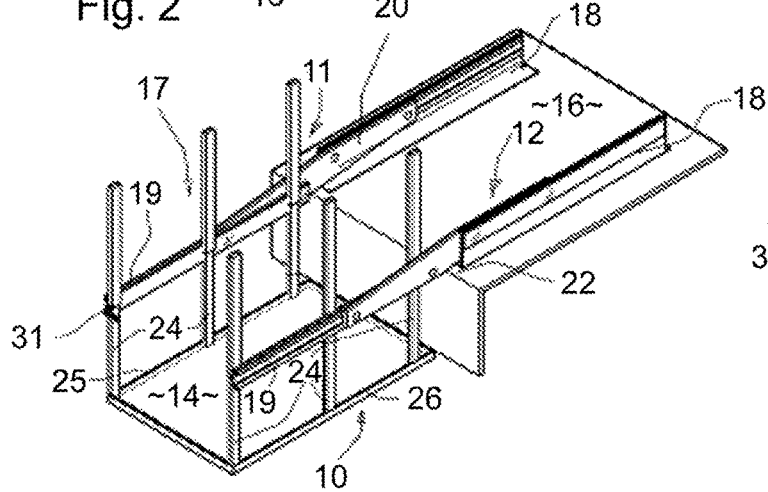
FIG. 3 illustrates the storage apparatus of FIG. 1 disposed with its article support means withdrawn from the stowed position and lowered to a more accessible position.

The elevating storage apparatus 10 illustrated in FIGS. 1 to 4 utilises a pair of opposed compound drawer slide assemblies 11 and 12 to support the opposite sides of an article supporting tray 14 whereby it may be withdrawn from a stowed position 15 above an elevated surface 16, as illustrated in FIG. 1, to a fully withdrawn position 17, as illustrated in FIG. 2, from which the tray 14 may be lowered to a more accessible position. Both compound drawer slide assemblies 11 and 12 have an outer slide support 18 fixed to the elevated surface 15, an inner slide assembly 19 connected to a respective opposite side of the article supporting tray 14 and a floating intermediate slide support 20 which enables the inner slide assembly 19 and the article support tray 14 carried thereby to be withdrawn past the front edge 22 of the mounting surface 15 on which the outer slide supports 18 are secured.

In this embodiment each inner slide assembly 19 carries three fixed upright carriers 23 which extend upwardly from the inner slide assembly 19 and within which complementary support members 24 fixed to the opposite sides 25 and 26 of the article support tray 14 are reciprocably supported.

Figure 4:
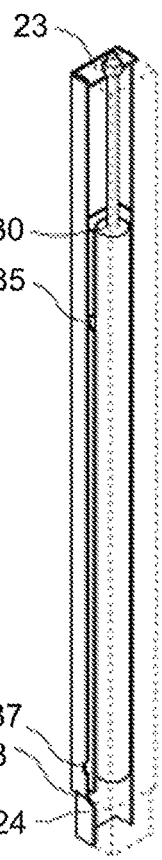
FIG. 4 is a cutaway view of one of the slidable supports for the apparatus illustrated in FIGS. 1 to 3.

As illustrated in FIG. 4, each upright carrier 23 and complementary support member 24, which are shown partially cut away, are rectangular hollow-section members whereby an internal energy storage means or powered drive means may be supported as illustrated at 30 with its upper end fixed to the upright carrier 23 and its lower end secured within the support member 24 for raising and lowering the tray 14. Some or each of these telescoping members 23 and 24 together with their drive means 30, if desired, may be constituted by a linear drive such as a powered hydraulic or pneumatic cylinder, a worm drive or a rack and pinion drive connected between the inner rail assemblies and the support tray 14.

A handle (not shown) for manipulating the support tray 14 may be secured to the front of the tray 14 where it will not interfere with free movement of the tray 14. Alternatively a handle provided on a supported article may be used to manipulate the movement of the support tray and the article supported thereon. Also if desired the support tray may be provided with depressions or other location means for accommodating and/or securing the feet of an article intended to be supported thereby.

In a typical application, the elevating storage apparatus 10 is provided for stowing a small refrigerator in an elevated position in the back of a four wheel drive vehicle whereby when parked, the refrigerator may be withdrawn from its stowed elevated position outwardly to a fully withdrawn position at which a slide latch 33 automatically locks the slide assemblies in their extended position and a lowering latch 31 together with the energy storage means 30 in the carriers 23 support the weight of a refrigerator and its contents in known manner. A user may then release the lowering latch 31, grasp a handle provided on the supporting tray or a handle provided on the refrigerator and urge the refrigerator to a lower position where it may rest on a bench or be supported by the support means 24 which are prevented from retracting from their respective carriers 23 by internal stops which may be constituted by the energy storage means being moved to their fully extended positions.

The latch 31 has a spring loaded pawl mounted on one carrier 23 which extends through an opening 37 in the carrier 23 to engage with an aperture 35 or 36 in the complementary support strut 24. This latch will engage a lower aperture 36 to hold the tray 14 elevated and an upper aperture 35 to maintain the refrigerator in its lowered accessible position. The lower positioning of the refrigerator assists with accessing top opening fridges and it is also useful for providing better access to front opening refrigerators and other cupboards which may be supported by the elevating stowage apparatus 10.

When it is desired to move the refrigerator back to its stowed position the operator simply releases the strut latch 31, which could be associated with a handle mounted on the support tray 14 or form the handle for the support tray, so that the refrigerator can be elevated by the support tray utilising either the accumulated energy in the energy storage means alone or with assisted effort from the user. When fully elevated the latch 24 will engage with the indentation 36 in the complementary support strut 24 to secure the support tray 14 in its elevated position. Thereafter the slide latch 33 which automatically locks the slide assemblies in their extended position is disengaged to allow the article support tray and the refrigerator supported thereby to be pushed backwardly to its stowed position where the slide latch 33 again locks the slide assembly in its retracted position to secure the article support tray in its stowed position.

An advantage of this embodiment is that the overall width of the supporting tray is very close to the distance between the inner slide assemblies so that the overall dimensions of the elevating storage apparatus 10 compared to the overall dimensions of the supporting tray can be minimised. Furthermore any number of guide members and complementary support struts may be utilised to provide support for different weight articles and in addition the upwardly extending guide members provide side support which may prevent toppling of a heavy article supported by the article support tray.

The further illustrated embodiments utilise similar components as is described for the above embodiment except for the linkages which interconnect the inner slide assemblies and the article supporting tray. For the sake of brevity, in the description of the following embodiments numbers utilised for similar components will be repeated and only the variations will be illustrated and/or described in detail.

Figure 5:
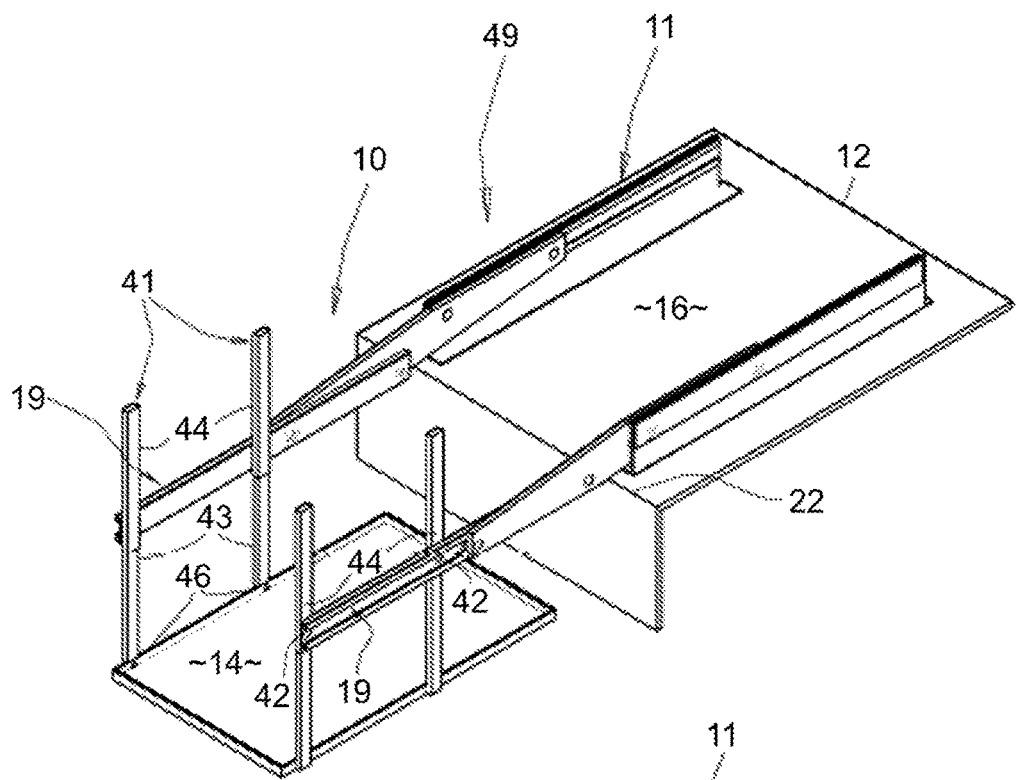
FIGS. 5 and 6 illustrate another embodiment of the invention showing the article support means in its lowered accessible position and its stowed position respectively.
Figure 6:
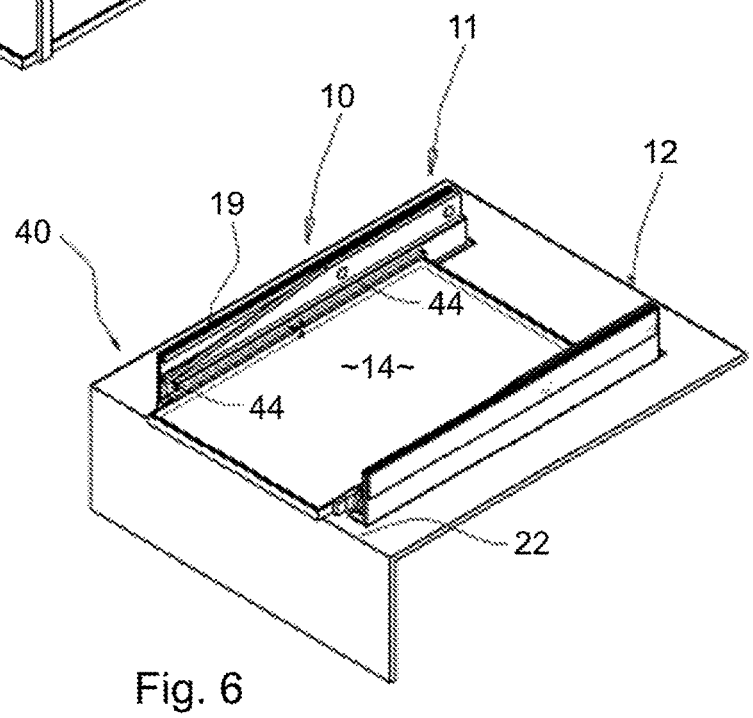
Figure 7:
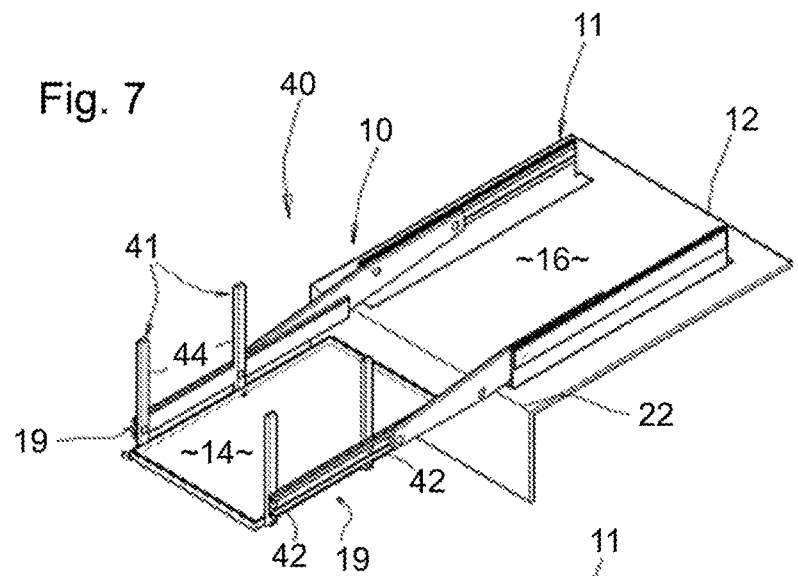
FIGS. 7, 8 and 9 illustrate the article support means of FIG. 5 and FIG. 6 disposed in positions intermediate the lowered accessible position and the stowed position.
Figure 8:
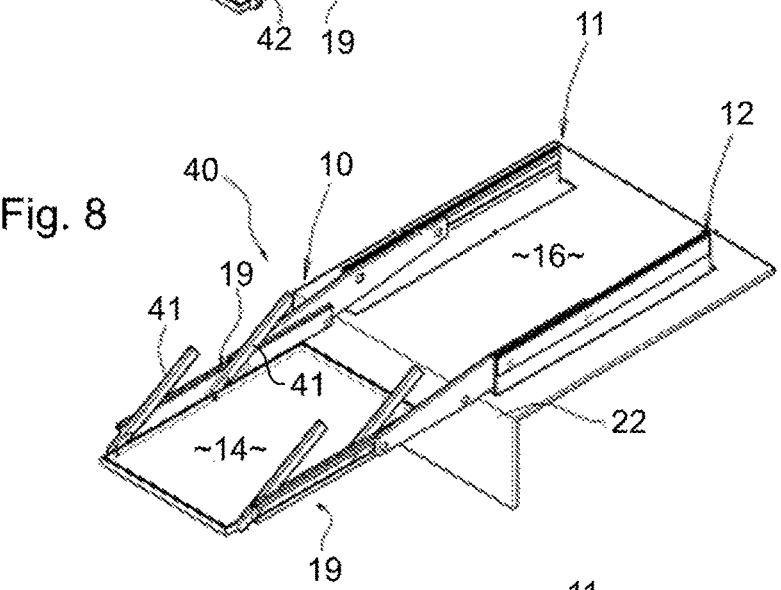
Figure 9:
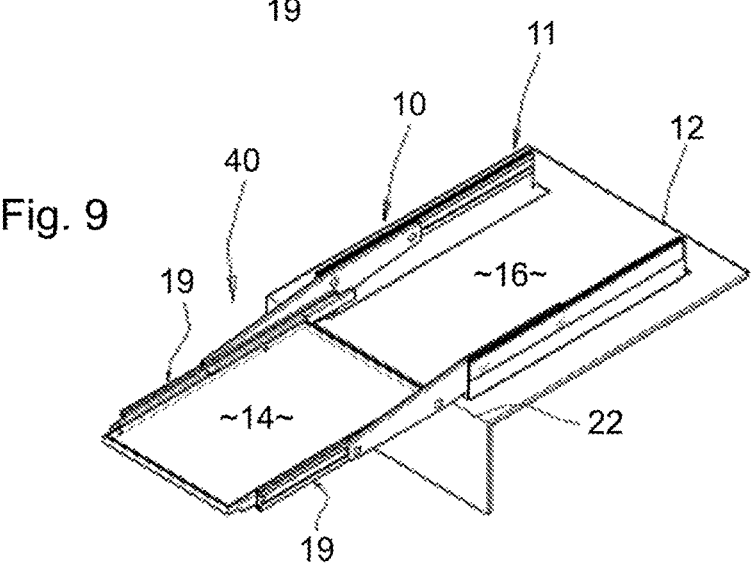

The elevating support apparatus 40 illustrated in FIGS. 5 to 9 utilises forward pivoting support assemblies 41, pivotally connected to the inner slide assemblies 19 and the support tray 14, to raise the article support tray 14 from its lowered position, as illustrated in FIG. 5 to its withdrawn position, as illustrated in FIG. 9 from which it may be slid rearwardly to its stowed position as illustrated in FIG. 6. The use of support assemblies 41 which pivot forwardly would significantly increase the overhang of the supporting tray 14 beyond the front edge 22 and thus substantially increase the load imposed on the compound drawer slide assemblies 11 and 12.

In this embodiment this overhang is minimised by forming each support assembly 41 as a telescopic assembly, having an upper carrier portion 44 pivotally connected to the respective inner slide assembly 19 at 42 which receive lower telescoping portions 43 pivotally connected to the respective sides of the support tray 14 at 46. With this arrangement the initial raising of the tray 14 is achieved by retracting the telescopic support assemblies 41 so as to position the tray 14 close to its uppermost position, as illustrated in FIG. 7, whereafter the telescopic support assemblies 41 are pivoted forward about their mounting pivots 42, as illustrated in FIG. 8, until the telescopic support assemblies 41 lie alongside their respective inner slide assemblies 19. The elevated supporting tray 14 may then be pushed rearwardly to its stowed position as illustrated in FIG. 6.

As in the previous embodiment the telescopic support assemblies 41 accommodate energy storage means to assist in lowering and raising a relatively heavy article supported on the tray 14. An advantage of this embodiment is that the rear pair of telescopic support assemblies 41 are disposed close to the centre of the support tray 14 so that they will support most of the weight of an article supported on the tray. As a result any energy storage means may be supported only within the rear pair of support assemblies 41. Furthermore, this placement enables relatively long top portions 44 to be utilised which accommodate the lower telescoping members 43 when they are retracted. In addition the telescopic support assemblies 41 could be constituted, if desired, by linear drive means as for the previously described embodiment.

Figure 10:
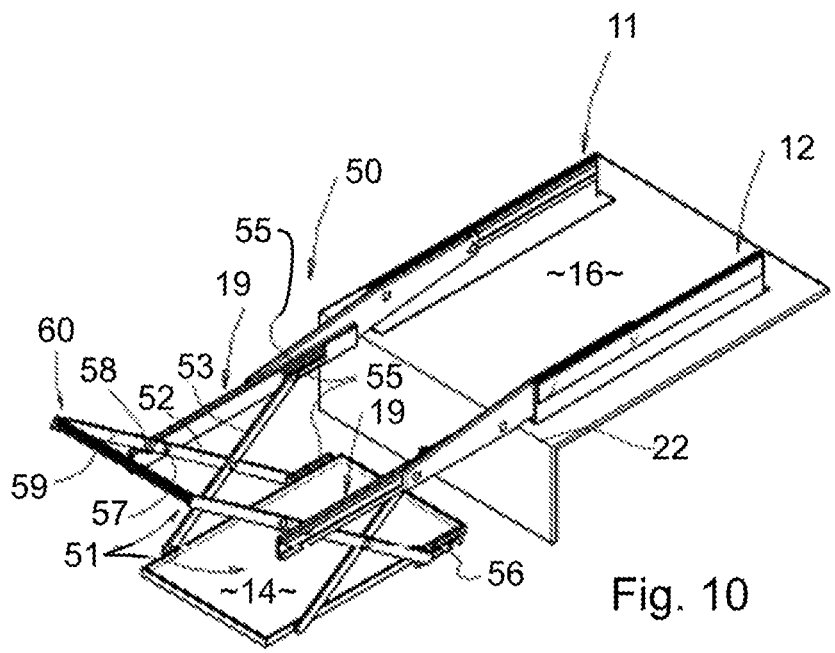
FIGS. 10 to 13 illustrate another embodiment of the invention which utilises a scissor type mechanism for raising and lowering the article support means.
Figure 11:
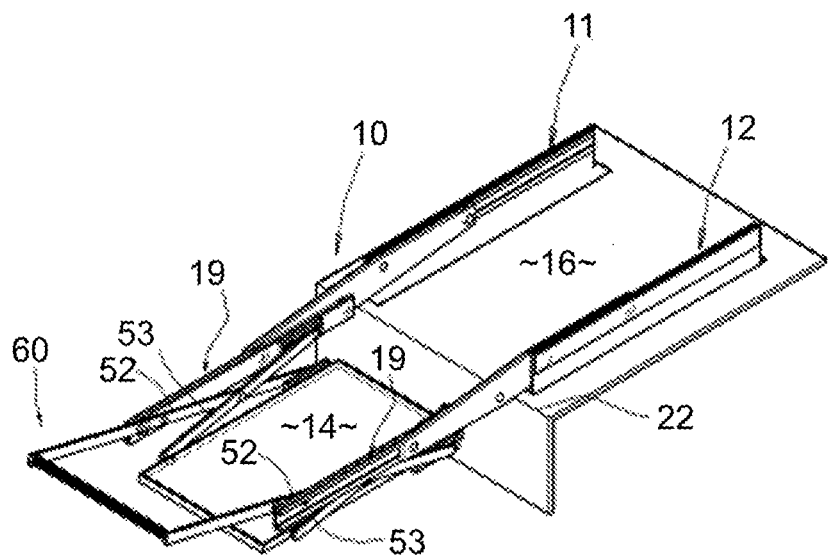

The embodiment 50 illustrated in FIGS. 10 to 14 utilises laterally spaced scissor mechanism 51 interconnecting the inner slide assemblies 19 to opposite sides of the support tray 14. For this purpose each scissor mechanism 51 includes a pair of links 52 and 53 connected together by a central pivot 54. The front ends of both links 52 and 53 are pivotally connected to a respective one of the inner slide assemblies 19 and sides of the supporting tray 14 at locations which are vertically aligned with one another. The opposite ends of the links 52 and 53 are pivotally connected to slide members 55 accommodated in respective slide carriers 56 so that they may move longitudinally with respect to the inner slide assemblies 19 and the support tray 14 as the latter is raised or lowered between its lower accessible position, as illustrated in FIG. 10 and its raised position. FIG. 11 illustrates the tray 14 in a partially raised attitude so that the relative movement between the components can be illustrated.

Figure 14:
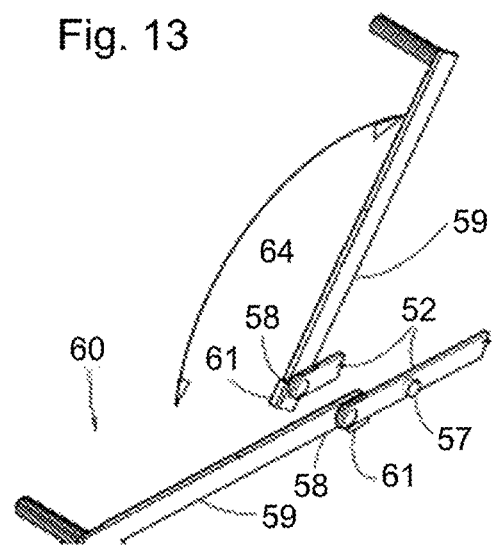
FIG. 14 illustrates the operation of the handle for the FIG. 10 embodiment.

It will be seen that the links 52, which connect pivotally at 57 to the outer ends of the inner slide assemblies 19, extend beyond their pivotal connection 57 to a further pivotal connection 58 which supports a respective leg 59 of a U-shaped handle assembly 60. The inner ends of these legs 59 extend inwardly beyond their pivotal connection to support a laterally extending abutment 61 which engages beneath the links 52 so that when the handle assembly 60 is pivoted down to a position at which its legs 59 are substantially aligned with the links 52, these abutments 61 prevent further pivoting of the handle assembly 60 without correspondingly pivoting the links 52 and as a consequence, raising the support tray 14. This is illustrated in FIG. 14 in which the legs and the end of the links 52 are shown in a lifting position and in a folding position.

In this embodiment the energy storage means is suitably connected between the adjacent upper ends or lower ends of the links 52 and 53 in one or both the scissor mechanisms 51.

Figure 12:
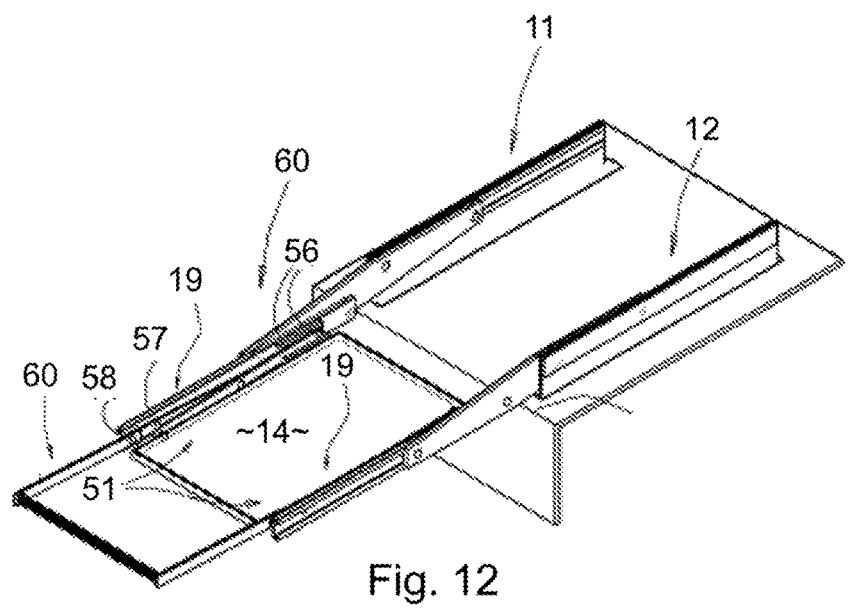
Figure 13:
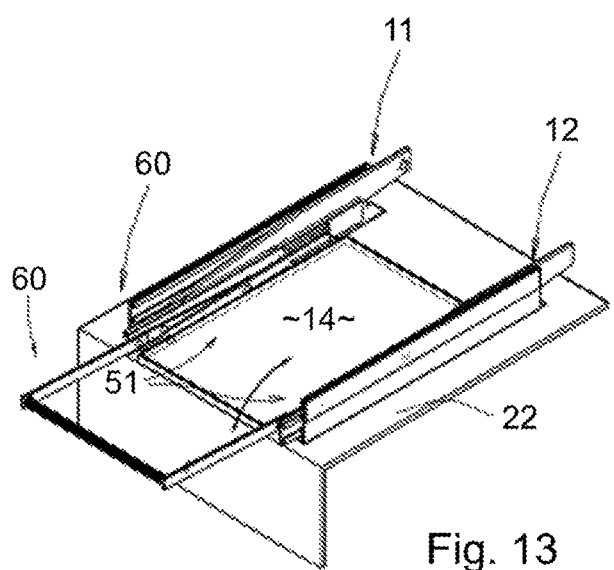

In this embodiment, operatively locking the handle legs 59 to the links 52 in a substantially aligned attitude has the advantage that when the handle assembly 60 is pushed to move the support tray rearwardly to its stowed position there is little or no tendency for the handle to pivot upwardly as illustrated by the arrow 64 in FIG. 12 which could cause a user to overbalance. At the same time the handle assembly 60 may be easily pivoted to a stowed position when lowered or stowed either adjacent the outer end of a supported article or across the top of a supported article. If desired the legs 59 could be cranked outwardly from their pivotal connection to increase the over centre action preventing accidental upward pivoting of the handle assembly 60.

The links 52 and 53 are pivotally connected together adjacent their mid points to form scissor mechanisms which are capable of maintaining the tray 14 parallel to the inner slide assemblies 19 during raising and lowering. If desired the point of interconnection of the links could be varied from this position to cause the tray 14 to tilt as it is moved between its extended position and its accessible position.

Figure 15:
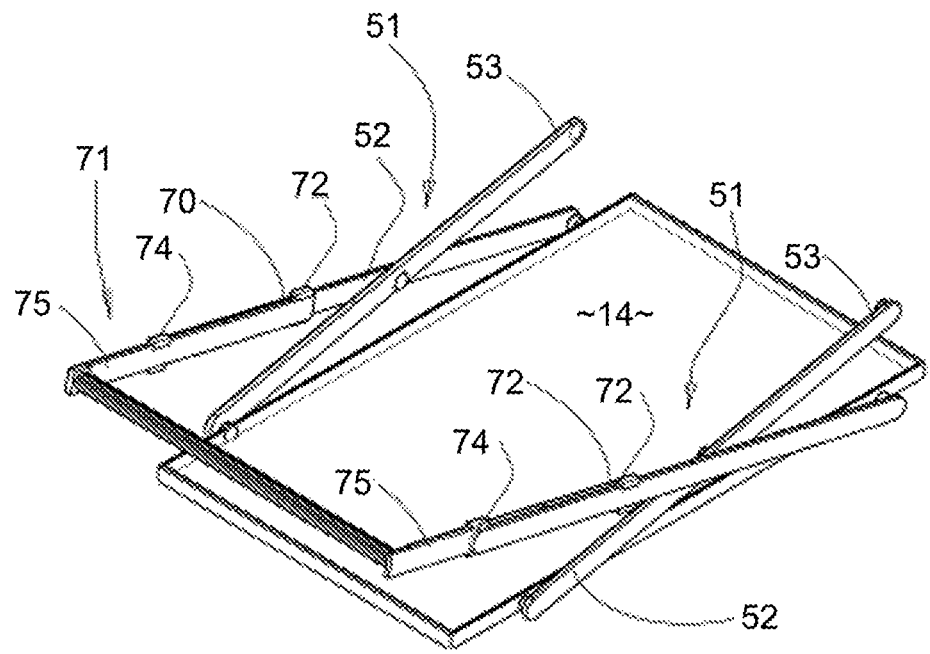
FIGS. 15 and 16 illustrate an alternate form of handle for the FIG. 10 embodiment.
Figure 16:
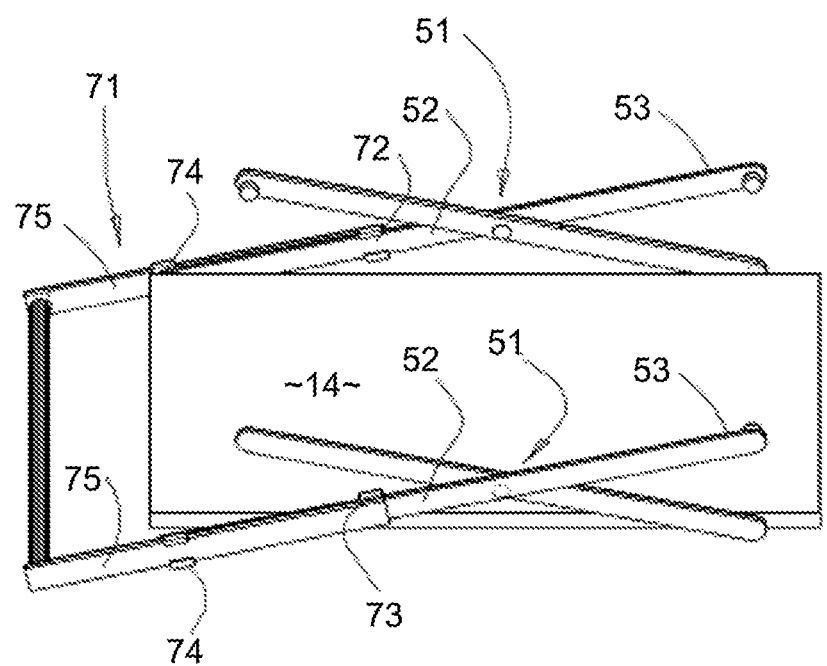

In the embodiment illustrated in FIGS. 15 an 16, which illustrate only the scissors mechanisms 51 and the supported tray 14 of the FIG. 10 embodiment, each inner end 70 of the handle assembly 71 is terminated by a sliding connection 72 to a respective link 52,53 which have respective opposed sliding connections 74 at their outer ends to the handle assembly 71 whereby the handle assembly 71 may be pushed inwardly to a stowed position, at which it lies alongside opposed pair of links 52 in FIG. 15 embodiment and links 53 in FIG. 16 embodiment, or retracted to an operative position extending from those links 52, 53.

At all times the handle assembly 71 is maintained in substantial alignment with the respective pairs of opposed links 52 or 53 whereby up or down pressure on the handle will apply a rotational force to these opposed pairs of links for lowering or raising the article support assembly. The amount and or direction of the applied force can be selectively varied by utilising energy storage means able to support the weight of an article on the tray 14 in its elevated position or energy storage means able to only partially support the weight of an article on the tray 14 in its elevated position. This applied pressure may also actuate drive means for raising or lowering the tray 14.

The embodiment illustrated in FIG. 16 could be utilised for accessing the handle where the stowed position is relatively high, such as on a car roof and if desired the legs 75 of the handles could also be telescopic to provide a longer extension of the handle. Of course the links 52 or 53 could be dogleg type links to position the handle assembly 71 in a desired attitude when stowed or when in use.

A retractable handle, either sliding, such as described above or telescopic or of other suitable form, could also be attached to the tray of any of the earlier embodiments of this invention as the control means.

The elevating storage apparatus of various embodiments of this invention could be used in or on vehicles, such as cars, commercial vehicles and caravans or in fixed structures for supporting any article which has to be moved to an elevated stored position above an obstacle preventing direct lowering of the article from its stowed position to its accessible position.

It is to be understood that the above has been given by way of illustration of aspects of this invention and that all such modifications and variations thereto as would be apparent to persons skilled in the art are deemed to fall within the broad scope and ambit of this invention as is defined the appended claims.

What is claimed is:

1. Elevating storage apparatus, including:
a pair of spaced apart slide assemblies for supporting article support means therebetween for longitudinal movement between a stowed elevated position above an obstacle and a withdrawn elevated position forward of the obstacle;
linkage means connecting the article support means to the slide assemblies which enable the article support means to be raised and lowered between substantially vertically aligned withdrawn and accessible positions, and
control means for selectively positioning the article support means relative to the slide assemblies; and
wherein each slide assembly is a compound slide assembly including an outer fixed slide support, an intermediate slide support and an inner slide assembly and each slide assembly, can be withdrawn from its stowed elevated position to a withdrawn elevated position at which both inner slide assemblies are supported beyond the outer fixed slide supports; and
wherein the linkage means includes spaced scissor type mechanisms connecting respective opposite side parts of the article support means to said inner slide assemblies; and
wherein the spaced scissor type mechanisms connect to respective inner slide assemblies each of which provides an outer fixed link pivot assembly and an inner sliding link pivot assembly and wherein one of the scissor mechanism links connecting to an outer fixed link pivot assembly is extendable to form a lever for raising and lowering the article support means.

2. Elevating storage apparatus as claimed in claim 1, wherein both the links connecting to an outer fixed link pivot assembly are extendable to form a lever and wherein both levers are interconnected by a transverse handle.

3. Elevating storage apparatus as claimed in claim 1, wherein the linkage means includes carriers on each inner slide assembly which slidably support a respective link extending to the article support means.

4. Elevating storage apparatus as claimed in claim 3, wherein the carriers attach pivotally to the inner slide assemblies and the respective links attach pivotally to the article support means.

5. Elevating storage apparatus as claimed in claim 3, wherein each carrier is an outer telescopic member within which a respective link is telescopically received.

6. Elevating storage apparatus as claimed in claim 5 and including drive means connected between the carriers and their supported links.

7. Elevating storage apparatus as claimed in claim 5 and including energy storage means connected between the carriers and their supported links.

8. Elevating storage apparatus as claimed in claim 4 and including selectively operable locking means for securing the carriers in a desired pivotal relationship with respect to the inner slide assemblies.

9. Elevating storage apparatus as claimed in claim 1, wherein the control means includes a control for selectively actuating powered drive means adapted to cause the linkage means to move the article support means between its withdrawn elevated position and its accessible position.

10. Elevating storage apparatus, including:
a pair of spaced apart compound slide assemblies for supporting article support means therebetween for longitudinal movement between a stowed elevated position above an obstacle and a withdrawn elevated position forward of the obstacle;
respective scissors type linkages connecting the article support means to a sliding inner pivot connection and a fixed outer pivot connection provided on the inner slide assemblies of both said compound slide assemblies, and
a stowable handle assembly mounted to the links of said scissor type linkages which connect to the fixed outer pivot connections, said handle assembly being moveable from a stowed position to an extended operative position at which the handle assembly may be utilised to raise and lower the article support assembly and withdraw the article support assembly from its stowed elevated position.

11. Elevating storage apparatus as claimed in claim 10, wherein the stowable handle is a folding handle assembly pivotally connected to the links of said scissor type linkage which connect to the fixed outer pivot connections, and being provided with stop means limiting the downward pivotal movement of the folding handle assembly about its pivotal connection to said links.

12. Elevating storage apparatus as claimed in claim 10, wherein the stowable handle is slidably connected to one or opposed pairs of the links of said scissor type linkages whereby it may be slid along said one link or opposed pairs of the links from a stowed position beside said one link or opposed pairs of the links to its extended operative position at which it may be utilised to pivot the links.

\* \* \* \* \*